3,141,047
HIGH MOLECULAR WEIGHT GLYCOLS FROM TELOMER BORATES

Donald D. Emrick, Shaker Heights, Ohio, assignor to The Standard Oil Company, Cleveland, Ohio, a corporation of Ohio
No Drawing. Filed Sept. 28, 1961, Ser. No. 141,279
13 Claims. (Cl. 260—635)

This invention relates to a process for the production of alkylene glycols from low molecular weight alpha- and beta-alkylene glycols by way of the telomerization of the corresponding alkylene glycol borates, hydrolyzing the borate telomers to telomer glycols, and to the high molecular weight alkylene glycols produced by this process, and to telomeric urethanes obtained from such glycols.

Telomerization involves the reaction of the olefin called a taxogen with a fragment of another molecule known as a telogen producing a telomer in accordance with the following equation:

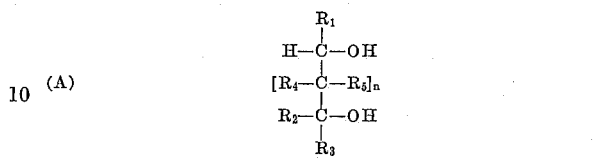

It is readily apparent from the above that the telogen in a telomer appears as units at the terminal of the main polymer chain. The telomerization reaction proceeds in the presence of a free radical initiator which removes an active hydrogen atom from the telogen. The resulting radical initiates the telomerization by adding to the double bond of the olefin.

The telomerization of numerous oxygenated compounds with olefins has been proposed in the Harmon Patent No. 2,423,497 and the Hanford et al. Patent No. 2,402,137. The telomerization reactions described in these patents are applicable generally to telogens containing oxygen in the molecule, including alcohols, aldehydes, ketones, acids, esters, acid anhydrides, ethers and acetals, as well as halogenated derivatives of aliphatic hydrocarbons and the above-described oxygented organic compounds. However, when the telomerization of olefins is attempted with alkylene glycols, it proceeds slowly, if at all, resulting in poor yields and low molecular weight products, so that the production of high molecular weight alkylene glycols from low molecular weight alkylene glycols cannot readily be effected by telomerization. The hydrogen atoms of alpha- and beta-alkylene glycols do not take part readily in the reaction mechanism, for some reason which is not understood.

In accordance with the invention, it has been determined that telomeric alkylene glycols can be prepared not by telomerizing the glycols directly but by first converting the alkylene glycol to the corresponding alkylene glycol borate, and this borate employed as the telogen in the presence of a free radical initiator for the telomerization. The alkylene glycol borates telomerize readily with unsaturated hydrocarbon taxogens. This reactivity is surprising, in view of the difficulty with which the corresponding alkylene glycols telomerize, and undoubtedly is due to the presence of the borate group in the molecule. The product of this telomerization is a telomer containing boron in the molecule in the form of an alkylene glycol borate end group. This borate group is then hydrolyzed in accordance with the invention, generating the telomer alpha- or beta-alkylene glycol, to which the polyolefin group is now attached.

The process of the invention is applicable to any alkylene glycol having a hydrogen atom, preferably tertiary, on at least one of the carbon atoms directly attached to oxygen, i.e., to a glycol hydroxyl group. These alkylene glycols can be defined by the following formula:

(A)

where $R_1$, $R_2$, $R_3$, $R_4$, and $R_5$ may be the same or different, and represent hydrogen atoms or alkyl, aryl, mixed aryl alkyl, mixed alkyl aryl or cycloalkyl groups each having from one to about ten carbon atoms and preferably not having more than eight carbon atoms, and being of a size and number such that the total number of carbon atoms in the alkylene glycol is from about three and preferably from about four up to about thirty, $n$ is zero or one.

It will be observed that the above general formula excludes ethylene glycol. Ethylene glycol can be employed, but it is more difficult to use than higher glycols because it has a tendency to form linear alkylene glycol borate polymers when reacted to form the corresponding alkylene glycol borates. Propylene glycol has a similar tendency, but does not form the linear polymers as readily as does ethylene glycol, and it is possible to obtain simple propylene glycol borates by careful reaction. This difficulty is not encountered with alkylene glycols having four to thirty carbon atoms.

Typical $R_1$, $R_2$, $R_3$, $R_4$ and $R_5$ radicals are methyl, ethyl, n-propyl, isopropyl, n-butyl, isobutyl, secondary butyl, tertiary butyl, n-amyl, isoamyl, tertiary amyl, n-hexyl, isohexyl, 2-ethylhexyl, n-heptyl, tert-heptyl, n-octyl, iso-octyl, tert-octyl, n-nonyl, tert-nonyl, n-decyl, tert-decyl, phenyl, xylyl, benzyl, beta-phenylethyl, alpha-phenylethyl, tolyl, ethylphenyl, dimethylphenyl, cyclohexyl, methylcyclohexyl, cyclopentyl and cycloheptyl.

The following alkylene glycols are typical of the general class to which the process of the invention is applicable: propanediol-1,2; propanediol-1,3; butanediol-1,3; butanediol-2,3; 2-methylpentanediol-2,3; 2-methylpentanediol-2,4; pentanediol-2,4; pentanediol-1,3; hexanediol-1,2; hexanediol-1,3; hexanediol-2,4; 2-ethylhexanediol-1,3; 3,5-dimethylhexanediol-2,4; 3,4-dimethylhexanediol-1,2; octanediol-1,2; 3-phenylpropanediol-1,3; 2,3-dimethylbutanediol-1,2; 2,4,4-trimethylpentanediol-1,2; decanediol-1,2; 2-ethyl-2-butylpropanediol-1,3; 2,2-diethylpropanediol-1,3; and octadecyleneglycol-1,2.

The corresponding alkylene glycol borates are readily prepared in accordance with known procedures, such as are described, for example, in U.S. Patent No. 2,741,548 to Darling, Fay and Szabo, patented April 10, 1956. Orthoboric acid is reacted with the glycol at a mildly elevated temperature. The water of reaction or at least a part of it is preferably removed, but a part or all of the water of reaction may remain in the reaction mixture, if desired. When the water is removed, it is preferably separated overhead, such as by blowing with nitrogen or by distillation. All of the water can be removed by simple boiling.

The structure of the alkylene glycol borate obtained depends upon the mole ratio of glycol to boric acid. This ratio can be 1:1, 2:2, or 3:2, and if a monovalent alcohol is incorporated, 1:1:1.

The formula of the alkylene glycol borate can be expressed in the following form:

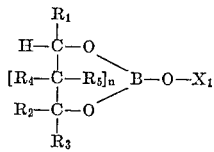

where $X_1$ is H, or $R_6$ or

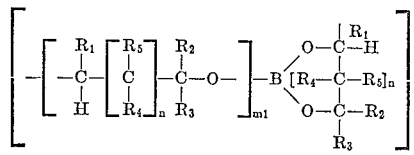

where $n$ is 0 or 1, and $m_1$ is 0 or 1.

The following specific groups of borates are within the class which can be used in accordance with the invention:

α-ALKYLENE GLYCOL BORATES

I. (1)

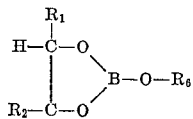     1:1:1

(2)

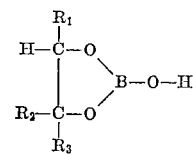     1:1

(3)

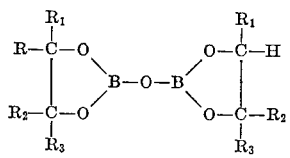     2:2

(4)

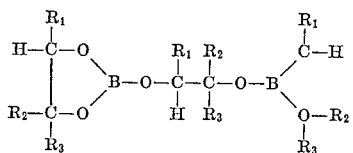     3:2

β-ALKYLENE GLYCOL BORATES

II. (1)

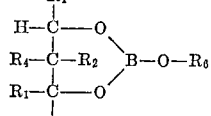     1:1:1

(2)

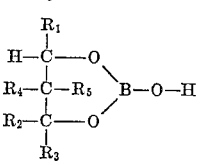     1:1

(3)

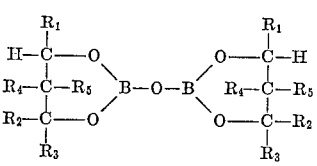     2:2

(4)

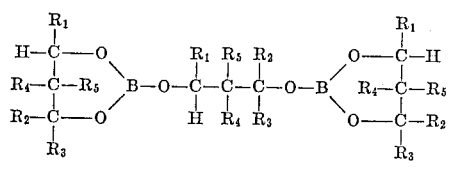

In the above formulae, the R radicals, including $R_6$, are as defined above.

Mixtures of alkylene glycols can be telomerized by the formation of mixed glycol borates in which $R_1$, $R_2$, $R_3$, $R_4$ and $R_5$ differ in different parts of the molecule. Such borates will include any of the various combinations of glycols with borate, depending upon the molar ratios of each. Structures of exemplary borates which can be formed from alkylene glycols and telomerized in accordance with the invention will be found in the disclosure of U.S. application for Letters Patent, Serial No. 821,111, filed June 18, 1959, and now abandoned.

These alkylene glycol borates are believed to react with the unsaturated hydrocarbons according to the following equation:

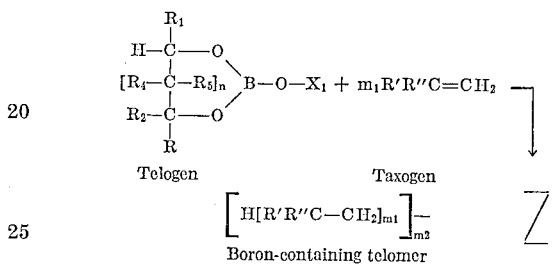

In the above formula, $X_1$ is as defined heretofore or as in Formula B, $m_1$ is the number of moles of compounds or unit noted and $m_2$ is the number of chains attached to the terminal group $$Z$$

which is the alpha- or beta-alkylene glycol borate residue, that is to say, the compounds of Formula B less the number of hydrogen atoms ($m_2$) that have been replaced.

R′ and R″ in the formula for the unsaturated hydrocarbon taxogen represent a hydrogen atom or an alkyl, aryl, mixed alkyl aryl, mixed aryl alkyl, or cycloalkyl radical having from one to about sixteen carbon atoms, and preferably not more than eight carbon atoms. These are referred to for convenience hereinafter as alpha-olefins.

Typical R radicals are phenyl, methyl, ethyl, isobutyl, n-hexyl, n-amyl, n-butyl, n-propyl, isopropyl, cyclohexyl, cyclopentyl, benzyl, methyl phenyl, ethyl phenyl, n-decyl, n-dodecyl, n-tetradecyl, and methyl cyclohexyl.

The taxogen is preferably ethylene or a mixture of ethylene and one or more other alpha-olefins containing a major proportion of ethylene. The highly branched olefins such as isobutylene do not telomerize as readily under peroxide-initiated free radical conditions and, therefore, although they may be used, are less desirable. Alpha-olefins higher than ethylene in molecular weight can be used alone, but react more slowly and produce lower conversions and yields than ethylene.

Telomers composed partially or wholly of higher taxogens such as propene, butene-1, pentene-1, 4-methyl pentene-1, 3-methyl hexene-1, hexene-1, heptene-1, octene-1, decene-1, styrene and 8-p-menthene are of lower molecular weight and lower melting point than those obtained using ethylene alone or ethylene-rich mixtures under comparable conditions.

The reaction requires a free radical initiator.

Furthermore, the telomerization reaction chain is easily interrupted and the reaction halted by conventional free radical inhibitors, and the reactants should be relatively free from such inhibitors.

Initiators which may be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; diaryl peroxides or diaralkyl peroxides such as dicumyl peroxide, perhalogen compounds, such as hexachloroethane, and combinations thereof with dialkyl peroxides, organometallic compounds such as tetraethyl lead and tetraphenyl lead; and azo-N-N-compounds such as azobis (isobutyronitrile) and diazoaminobenzene.

Di-tert- butyl peroxide and alpha-dicumyl peroxide are preferred free radical initiators for use in the process of this invention.

The stability of free radical initiators is customarily evaluated in terms of half-life at a stated temperature, and the following table compares this for several commercially available free radical initiators.

Table I

| Compound | Temp. (°C.) | Half Life (Hours) | No. of Moles of Radical Produced per Pound |
|---|---|---|---|
| 1. Tetraethyl Lead | | | 5.62 |
| 2. Lauroyl Peroxide | 50 | 54.2 | 2.27 |
| | 70 | 3.4 | |
| | 85 | 0.5 | |
| 3. Dicumyl Peroxide | 115 | 12.4 | 3.34 |
| | 130 | 1.8 | |
| | 145 | 0.38 | |
| 4. Di-t-butyl Peroxide | 100 | 218 | 6.20 |
| | 115 | 34 | |
| | 130 | 6.4 | |
| | 145 | 1.4 | |
| | 160 | 0.24 | |
| 5. Benzoyl Peroxide | 70 | 13.0 | 3.74 |
| | 85 | 2.15 | |
| | 100 | 0.40 | |
| 6. 2,4-Dichloro-benzoyl peroxide | 50 | 17.8 | 2.38 |
| | 70 | 1.41 | |
| | 85 | 0.25 | |
| 7. Azobis (isobutyro-nitrile) | 80 | 1.26 | 5.50 |

In general, the half-life of the free radical initiator employed should, at the reaction temperature, be within the range of from about 0.01 to about 10 hours, since such initiators have been found to give the best results. By suitable modification of the reaction conditions, however, it is possible to employ free radical initiators whose half-life is outside this range.

The reaction conditions can be widely varied. The preferred reaction temperature is established by the temperature at which the free radical initiator decomposes to give a rapid liberation of a substantial amount of free radicals within the above-stated range for half-life. For di-tertiary-butyl peroxide, for example, as the table shows, the preferred reaction temperatures are within the range of from 125 to 195° C. Lauroyl peroxide, on the other hand, can be used at temperatures of from 65 to 120° C. At reaction temperatures below this, the reaction time tends to be quite long because of the slower evolution of free radicals. Higher temperatures may be wasteful, unless strict incremental addition of the free radical initiator is used, since the free radical initiator may be decomposed at a higher rate than can be utilized in the telomerization, so that the free radicals will be lost and therefore wasted. In general, for heat-decomposable free radical initiators, reaction temperatures within the range of 40 to 200° C. are useful.

If the boiling point of the unsaturated hydrocarbon is low, it is necessary to operate under pressure.

If the free radical initiator is decomposable by radiation, such as by ultraviolet rays, such radiation can be used, and it may then be unnecessary to heat the reaction mixture above room temperature. Azo-bis (cyclohexane nitrile) and azo-bis(isobutyronitrile) are initiators of this type, and in fact the latter initiator could be used to effect telomerization at temperature below 0° C.

If the reactants are liquids at the reaction temperatures, no solvent is necessary unless dilution is desired to maintain control of the reaction rate. However, a solvent for the unsaturated hydrocarbons will assist in bringing it into contact with the telogen, and it may be possible by virtue of such facilitation of the reaction to use less olefin in the reaction mixture. A solvent may also be desirable when the telogen is a solid in order to increase the reaction rate.

Any such solvent should be inert under the telomerization reaction conditions. Suitable solvents include benzene, cyclohexane, n-heptane, n-octane and iso-octane. Preferably, the reaction mixture is agitated.

The reaction is exothermic, and requires careful control to prevent the temperature from rising so high that free radical initiator decomposition becomes too rapid.

The reaction time will depend upon the initiator and the reactants, the concentrations thereof, and the reaction temperature. It is usually convenient to employ reaction conditions such that the reaction can be completed in a time as short as one hour. Reaction times as long as fifty hours, however, may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature throughout the reaction during the strict incremental addition of the free radical initiator. In this manner, greater telogen conversions may be obtained together with the production of telomers of a more uniform average molecular weight distribution.

A continuous reaction is of particular interest in commercial process. This is readily effected by suitable equipment which permits continuous blending of the alkylene glycol borate with the olefin and free radical initiators, holding them in a pressurized reaction chamber in which they have a dwell time equivalent to that required to complete the reaction, and then drawing them off to a working-up chamber where the solvent is removed and the residue recovered.

Telomer products having a wide range of molecular weights which vary according to the reactants, reaction conditions, and concentration of reactants are obtainable. The telogen used affects the molecular weight of the telomer obtained, but not to such a great extent as the pressure of the taxogen.

The borate groups are then removed from the telomer by hydrolysis. Several methods are available.

In one procedure, the alkylene glycol borate telomer is hydrolyzed in an aqueous solution or suspension of an inorganic or organic base, such as an alkali or alkaline earth metal oxide, hydroxide, or carbonate, for example, sodium hydroxide, potassium hydroxide, calcium hydroxide, calcium oxide, and barium hydroxide, monoethanolamine and triethanolamine. The rate of hydrolysis can be accelerated by beating the mixture, if desired, and by carrying out the reaction under conditions such that intimate contact with the base is assured. The higher the concentration of base, the more rapid the hydrolysis. From 5 to 40% solutions of sodium and potassium carbonate give a satisfactory rapid hydrolysis even at room temperature. A 5 to 40% suspension of calcium hydroxide also is effective. In addition to water, aqueous alcohol, such as aqueous methanol, and ethanol solutions may be used, as well as the alcohol alone. Hydrolysis is usually very rapid when carried out at a reflux temperature of approximately 100° C. with an excess of base. Saturation of the reaction solution with salt such as sodium chloride minimizes extraction losses of low molecular weight telomer glycol to the aqueous phase, because of the "salting out" effect.

The telomer glycol hydrolysis product is immiscible with the aqueous phase so that the telomer glycol can be separated from the hydrolysis reaction mixture by decantation or solvent extraction. The telomer glycol or solution thereof can be washed as with water or aqueous saturated salt solution to remove excess alkali, and, if an anhydrous product is required, can be further dried by heating in a vacuum or by azeotropic distillation.

A modification of the above hydrolysis procedure is available. In this method the borate telomer is dissolved in an organic solvent immiscible with water, such as benzene or toluene, and the inorganic base added with a very small amount of water, after which the mixture is heated and stirred until hydrolysis is complete. If the solvent is one which forms an azeotrope with water, it will assist in removing water from the reaction mixture at the conclusion of the reaction. An appropriate proportion of the base is approximately 10 to 25% by weight of the telomer, and the amount of water can range from 25 to 100% of the weight of the base.

The glycol hydrolysis product is soluble in toluene, and the solvent phase can be separated from the alkaline water phase by decantation and filtration. The toluene or other organic solvents can then be removed by distillation, preferably under vacuum, desirably removing water azeotropically, to recover a relatively dry glycol. This method is not usually effective to remove all of the boron, in contrast to the first-described procedure, but the hydrolysis usually proceeds sufficiently far to make the procedure useful for most commercial purposes, recycling unhydrolyzed telomer for further treatment.

It is also possible to deborate the telomer by heating the telomer with a polyhydric alcohol such as glycerol or mannitol. In this procedure, transesterification takes place, the boric acid forming an ester with the polyhydric alcohol in order to drive the transesterification to completion; however, this polyhydric alcohol may be difficult to remove from the telomer glycol.

The telomer glycols obtained by this procedure have molecular weights ranging from as low as 118 to considerably beyond 30,000, depending upon the telomerization conditions, particularly the pressure of the taxogen. The low molecular weight materials, i.e., those having average cryoscopic molecular weights from about 118 to about 1500, are viscous oils or soft solids. The medium molecular weight materials having solution viscosity molecular weights of from about 1500 to about 12,000 are waxes, the hardness, flexibility and toughness of which increase with molecular weight. The high molecular weight materials having solution viscosity molecular weights in excess of 12,000 are tough plastic resins. In general, the melting point or pour point of the glycols is up to 20° C. higher than the corresponding telomer borates, and the waxy products are opalescent or relatively more white-opaque than the translucent or almost transparent borates.

The following examples are illustrative of the process and products of the invention.

In these examples, the following procedure was used to determine the solution viscosity of the high molecular weight telomer borates obtained:

Viscosity molecular weights were determined using the Harris viscosity molecular weight equations (Harris, J. of Polymer Science, 8 (353) (1952)), or the Erchak relationship (U.S. Patent No. 2,712,534, patented July 5, 1955). Specifically, the viscosities of two or more concentrations of the telomer dissolved in p-xylene at 115.15° C. were measured. Graphical estimates of the intrinsic viscosity and the specific viscosity were then made for extremely low levels of concentration and were used for estimating the Erchak molecular weight. The viscosity molecular weight values of the products obtained depended upon the specific reaction involved and the conditions used. For a particular telogen reactant, the viscosity molecular weight was largely dependent upon the olefin concentration or pressure employed in the telomerization.

EXAMPLE 1

Two telomerizations were carried out, one employing 2-methylpentanediol-2,4 and one bis(2-methylpentanediol-2,4) diborate. The reactions were carried out under comparable conditions, so as to be able to compare the ease of telomerization and the yields obtainable.

(A) *Run using 2-methylpentanediol-2,4.*—Into a 250 ml. capacity Magne-Dash autoclave were placed 64.5 grams of 2-methylpentanediol-2,4 and 2.3 grams of di-tertiary butyl peroxide. The autoclave contents were purged of air by means of pure nitrogen and pressured up with ethylene. The vessel was then heated with stirring at 263° F. and maintained within the temperature range of 263 to 300° F. for 7 hours. The initial ethylene pressure at 260° F. was 2050 p.s.i., and the final ethylene pressure at 296° F. was 1650 p.s.i. From the crude product, 10 grams of methanol-insoluble glycol telomer fraction (room temperature precipitation) was isolated.

(B) *Run using bis(2-methylpentanediol-2,4) diborate.*—Bis(2-methylpentanediol-2,4) diborate was prepared according to the following procedure:

49.5 grams of dry orthoboric acid and 94.5 grams of 2-methyl-2,4-pentanediol (a 1:1 molar ratio) were mixed together. Upon mixing, the temperature dropped approximately 8 to 10° C., and upon additional stirring, the temperature then rose rapidly to and slightly above the initial temperature, at which time the mixture became solid. The mixture was then heated and became completely liquid at about 70 to 75° C., 100 cc. of benzene was added, and the water formed was removed azeotropically by distillation with the benzene over a period of several hours.

Into a 500 ml. capacity Magne-Dash autoclave was placed 90.6 grams of bis(2-methylpentanediol-2,4) diborate and 5 grams of di-tert-butyl peroxide. The autoclave contents were purged of air by means of pure nitrogen and pressured up with ethylene. The vessel was then heated with stirring to 279° F., and maintained within the range of 279 to 291° F. for 5 hours. The initial ethylene pressure was 3080 p.s.i. at 255° F., and the final ethylene pressure 470 p.s.i. at 274° F. From the crude product 77 grams of room-temperature-benzene-insoluble borate telomer fraction of Harris equation viscosity molecular weight 5000 and 104 grams of room-temperature-benzene-soluble methanol-insoluble borate telomer fraction were isolated. This was a total of 181 grams of combined methanol-insoluble borate telomer fraction.

The above results show that the telomerization with the glycol alone proceeded with great difficulty, resulting in a poor yield. The corresponding glycol borate telomerized readily with the production of an excellent yield, 18 times that of the yield using the glycol alone.

EXAMPLE 2

Two telomerizations were carried out, using butanediol-1,3, and bis(butanediol-1,3) diborate under comparable conditions, so as to compare the ease of telomerization of these two telogens.

(A) *Run using butanediol-1,3.*—Into a 1000 ml. capacity Magne-Dash autoclave was placed 201 grams of butanediol-1,3 and 2.3 grams of di-tert-butyl peroxide. The autoclave contents were purged of air by means of pure nitrogen and pressured up with ethylene. The vessel was then heated with stirring to 276° F., and maintained within the range from 276 to 289° F. for four hours. The initial ethylene pressure was 2400 p.s.i. at 281° F. The final ethylene pressure at 277° F. was 2200 p.s.i. From this product, there was separated 6.8 grams of acetone-insoluble toluene-soluble glycol telomer fraction and 6.1 grams of room-temperature-toluene-insoluble glycol telomer fraction of Harris viscosity molecular weight 4890.

(B) *Run using bis(butanediol-1,3) diborate.*—Bis(butanediol-1,3) diborate 2:2 was prepared according to the following procedure. 264 grams of butanediol-1,3 was reacted with 181 grams of dry orthoboric acid by mixing the two ingredients together. Upon mixing, the temperature dropped approximately 8 to 10° C., but upon additional stirring the temperature rose rapidly to slightly above the initial temperature. The mixture was then heated to about 75° C. and 300 cc. of benzene added. The water formed in the course of the reaction was removed azeotropically by distillation with the benzene over a period of several hours.

Into a 1000 ml. capacity Magne-Dash autoclave was placed 226 grams of pure bis(butanediol-1,3) diborate and 2.3 grams of di-tert-butyl peroxide. The autoclave contents were purged of air by means of pure nitrogen and pressured up with ethylene. The vessel was then heated with stirring to 273° F. and held within the range from 273 to 293° F. for 7 hours. The initial ethylene pressure at 276° F. was 2500 p.s.i. and the final ethylene pressure at 289° F. was 1500 p.s.i. From the crude product, there was isolated 30 grams of acetone-insoluble toluene-soluble borate telomer fraction and 3 grams of room-temperature-toluene-insoluble borate telomer fraction.

It is apparent from the above results that the bis(butanediol-1,3) diborate telomerized far more readily than the butanediol-1,3. The yield obtained was approximately 3 times that using the glycol.

The borate telomers obtained in Examples 1 and 2 were each hydrolyzed to the corresponding telomer glycol, using the following procedure. 10 parts of the telomer was vigorously stirred and refluxed for 30 minutes with 20 parts of 15% sodium hydroxide solution. The excess aqueous alkali was then decanted off from the sticky mass of glycol obtained. The mass was washed with water several times, and then stirred in reflux with four successive changes of water, and the entrained water removed by azeotropic distillation with toluene. The resulting products were opalescent white, brittle, hard materials.

EXAMPLE 3

283.5 grams of 2-methyl-2,4-pentanediol and 99 grams of dry orthoboric acid (a 3:2 molar ratio) were mixed together. Upon mixing, the temperature dropped approximately 8 to 10° C., and upon additional stirring the temperature then rose rapidly to and slightly above the initial temperature, at which time the mixture became solid. The mixture was then heated and became completely liquid in about 70 to 75° C. 100 cc. of benzene was added, and the water formed was removed azeotropically by distillation with the benzene over a period of several hours.

A three-necked 1000 ml. flask was provided with a mechanical stirrer and reflux condenser, and was heated externally by means of an oil bath. A mixture of 210 g. of n-decene-1 and 185 g. of tris(2-methylpentanediol-2,4) diborate (3:2) was placed in a reaction flask. The contents were heated to 140° C. to 150° C., and 17.5 g. of di-tert-butyl peroxide were added over a period of 15 minutes. The reaction mixture was heated within the range of 140 to 150° C. for an additional 10 hours.

The mixture was cooled, and then deborated by heating at 100° C. with 1500 g. of alkaline mannitol solution (0.05 g. of mannitol and 0.159 g. of NaOH/cc.) for ½ hour. The combined phases from this treatment were extracted with an excess of chloroform. Distillation of the combined chloroform layers produced 141 g. of an oil, 147 g. of recovered 2-methylpentanediol-2,4 and 98 g. of recovered n-decene-1. The telomer-derived oil had a viscosity of 104.96 cs. at 100° F. and 13.09 cs. at 210° F., and a viscosity index of 122.

EXAMPLE 4

Into an 800 ml. flask fitted with a reflux condenser was placed 260 g. of tris(2-ethylhexanediol-1,3) diborate (3:2) and 193 g. of n-octene-1. The mixture was heated to 125° C., the reflux temperature, and 30.6 g. of di-tert-butyl peroxide was added over a period of about 1 hour. Refluxing at a temperature within the range from 125° to 130° C. was continued for an additional 50 hours.

The mixture was cooled and then deborated by heating at 100° C. with 2000 g. of alkaline mannitol solution (0.05 g. of mannitol and 0.159 g. of NaOH/cc.) for ½ hour. The combined phases from this treatment were extracted with an excess of chloroform. Distillation of the combined layers produce 161 g. of an oil, 214 g. of recovered 2-ethylhexanediol-1,3 and 53 g. of n-octene-1. The telomer-derived oil had a viscosity of 271.1 cs. at 100° C. and 221.2 cs. at 210° C., and a viscosity index of 108.

EXAMPLE 5

Into a 500 ml. capacity Magne-Dash autoclave was placed 90.8 grams of bis(2-methylpentanediol-2,4) diborate, 5.0 grams of di-tert-butyl peroxide, 80.9 grams of pure benzene and 16.3 grams of freshly distilled uninhibited styrene. The contents were flushed with and pressure-tested with nitrogen, after which the nitrogen was cautiously released. Sufficient gaseous ethylene was then charged into the vessel to produce a pressure of 6050 p.s.i. at 136° C. The mixture was heated up to and the reaction conducted at 136 to 156° C. for two hours and for 14 more hours at 145 to 152° C. After two hours, pressure at 152° C. was 2300 p.s.i.g. and the final pressure at 145° C. was 940 p.s.i.g. Upon cooling and venting off the unreacted gaseous ethylene, 200 grams of sticky, tacky benzene-free borate-containing telomer wax was obtained. Nearly all of the styrene-ethylene cotelomer was soluble in warm benzene.

The borate telomer was deborated by dissolving 200 grams of telomer in 800 to 1200 ml. of toluene, adding 50 grams of freshly slaked lime in 24 ml. of water. The resulting slurry was then refluxed and stirred for 3 minutes. The mixture was then allowed to stand a few minutes after which the upper hot toluene phase was separated for most of the lower inorganic phase by decantation and filtered while hot. The toluene was removed by vacuum at 100° C. over a water bath, recovering the telomeric glycol.

The telomer glycols of the invention have the formula:

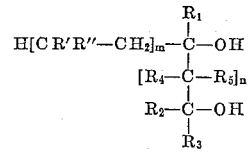

In the above formula $R_1$, $R_2$, $R_3$, $R_4$ and $R_5$ are selected from the group consisting of hydrogen and organic radicals having from one to ten carbon atoms, the total of $R_1$ to $R_5$, plus the carbon atoms of the glycol unit, being from about four to about thirty carbon atoms, and $R'$ and $R''$ are selected from the group consisting of hydrogen and organic radicals having from one to sixteen carbon atoms. $n$ is 0 or 1, and $m$ is an integer whose value depends upon the molecular weight of the telomer-derived polyhydrocarbon group.

These glycols are themselves susceptible of many reactions, because of the presence of hydroxyl groups. They can, for example, be reacted with isocyanates or polyisocyanates, such as toluene-2,4-diisocyanate, to produce urethane or polyurethane resins of much higher melting point, as is described in detail later.

Alkylene glycol telomers having tertiary hydroxyl groups are sensitive to dehydration and will dehydrate in acid media. If esterification is attempted in acid media, dehydration of the tertiary hydroxyl groups may be obtained rather than esterification. Primary and secondary hydroxyl groups are not sensitive in this way; thus, the telomer glycols of the invention can readily be dehydrated to produce olefins at the tertiary hydroxyl groups using acid media. Primary and secondary hydroxyl groups can be dehydrated by other procedures, if desired, to form the corresponding olefin. It is possible by selective dehydration to dehydrate tertiary hydroxyls but not primary or secondary hydroxyls, thus producing high molecular weight unsaturated monohydric alcohols. Removal of both the hydroxyl groups of the telomers of the invention by dehydration will produce long chain, probably conjugated, dienes.

The following example illustrates a dehydration reaction.

EXAMPLE 6

The telomer of Example 3 was refluxed with 20% hydrochloric acid for one hour. The resulting mixture was poured into crushed ice and the resulting solids broken up and washed free of acid with water. After drying, the solid was a tacky, translucent resin of wax-like appearance. Infra-red analysis confirmed the presence of the diene linkage and the absence of OH groups. These dienes are susceptible to further polymerization or cross-linking by procedures used for modifying isoprene and butadiene rubbers to produce complex resins.

The telomer glycols of the invention, as the general formula shows, possess a polyhydrocarbon group and a terminal alkylene glycol group. As a result, they have most attractive properties, both chemical and physical.

The polyhydrocarbon group of the telomer according to its molecular weight and the nature of the olefin used controls the melting properties of the telomer, which vary from a liquid through a wax to a synthetic resin. The alkylene glycol group imparts reactivity with isocyanates or polyisocyanates to produce urethane or polyurethane resins, and with inorganic and organic acids, acid chlorides and acid anhydrides to form monomeric and polymeric esters, depending upon whether the hydroxyls are stable to esterification and whether the acid reactant is monocarboxylic or polycarboxylic. When stable, dicarboxylic acids form linear thermoplastic polymers, and tricarboxylic acids form cage type or thermosetting polymers.

In addition to their use as chemical reactants in the preparation of resins, the medium and high molecular weight telomer glycols of the invention having molecular weights in excess of 1500 are useful in wax formulation, in coating applications and as textile lubricants. The liquid and oily telomers are useful as lubricants for textiles, machinery and internal combustion and jet engines, as lubricant additives and as hydraulic fluids. The waxy telomers are useful as waxes in the formulation of polishes, candles, carbon paper, crayons, matches, and printing inks. The resinous materials are thermoplastic, and can be used in coating compositions, hot melts, rubber compounding, and wire cable and pipe covering. Both waxes and resins can be blended with polyethylene and/or paraffin wax, and the blends can be used in coating compositions for paper and paper containers, for example, milk cartons.

The lower and medium molecular weight glycols of the invention are excellent emulsifiers for water, the water being emulsified into the organic phase. Telomer glycols of the invention are capable of emulsifying from 5 to 10 times their own weight of water within their own structure. This property, which has never been observed in polyethylene, probably is due to the polar affinity for water of the terminal hydroxyl groups, while the polyhydrocarbon part of the molecule is oleophilic or oil-soluble. High molecular weight alcohols, ketones, esters and the like can be made to emulsify water within their structure by the addition of alkylene glycol telomers. This property is evidenced by telomer glycols having molecular weights up to approximately 5000, and is most striking in telomer glycols having a molecular weight within the range from 1000 to 3000.

Of particular interest are the telomeric urethanes prepared from telomer glycols of a highly branched structure in accordance with the invention.

Polyurethanes are prepared by reacting polyethers or aliphatic glycols with polyisocyanates. The glycols customarily have a relatively low molecular weight, as compared to the resulting polyurethanes, and an aliphatic, aromatic or heterocyclic structure to which the hydroxyl groups are attached. The glycols normally are α,ω-glycols, i.e. the hydroxyl groups normally are at the ends of the aliphatic, aromatic or heterocyclic nucleus, and the nucleus, such as the aliphatic chain, can range up to about 12 carbon atoms, starting with ethylene glycol. The cyclic glycols can have two hydroxyl groups attached to the same ring, or to different rings themselves connected by a suitable linking group.

The polyisocyanate is also of low molecular weight and normally is an aromatic diisocyanate such as tolylene-2,4-diisocyanate.

The resulting polymers contain urethane groups derived from the relatively short-chain glycol and the original isocyanate. The urethane groups form an integral part of the polymeric chain, the properties of which to a large extent are determined by the relatively short glycol and isocyanate units. There is accordingly a high proportion of urethane groups per unit of molecular weight of the repeating groups in the chain. Expressed in another way, the polyurethanes of this type will normally have one urethane group for each two to twelve carbon atoms.

The telomeric urethanes of the invention are quite different from polyurethanes of the normal type, in that they have a relatively small proportion of urethane groups as compared to the total number of carbon atoms. The telomer portion of these urethanes is similar to a polyolefin, and has an important modifying effect upon the urethane portion. Structurally, the telomeric urethanes of the invention can be regarded as types of block copolymers, one block portion of which is the polyolefin telomer group, and the other block portion of which is the urethane group.

Furthermore, the telomeric urethanes of the invention can be divided into two general groups, (1) the monourethanes, in which the main polymeric chain is the telomer-derived polyhydrocarbon group, the said chain having at a terminal portion thereof one or two monourethane groups, and (2) the polyurethanes, in which the main polymer chain is a polyurethane chain, in which the polyolefin telomer groups are present as side chains attached thereto. These side chains can be of substantial size, as compared to the polyurethane chain.

Such telomeric urethanes are obtainable by reaction with an isocyanate of the telomer glycols of the invention.

If a monoisocyanate is used, the telomeric urethane has the structure:

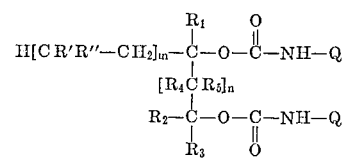

If the isocyanate has two isocyanate groups, the telomer urethane has a linear structure, in which the polyolefin telomer groups are present as side groups:

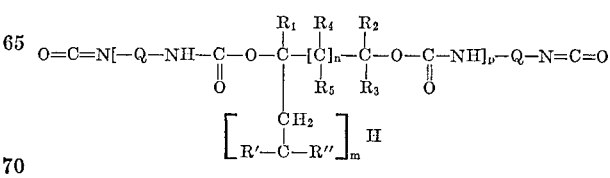

If the polyisocyanate has three or more isocyanate groups, a cage-type polymer can be formed, the cage structure being linked together with urethane groups, and the polytelomer derived polyhydrocarbon group being present in the form of side groups, as in the following structure for a triisocyanate:

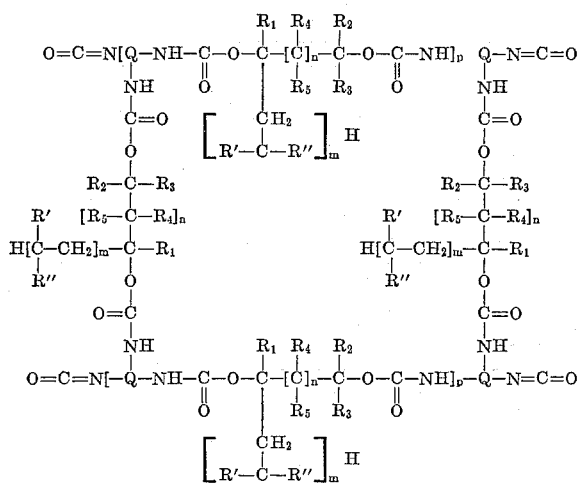

In the above formulae, Q represents the organic radical of the isocyanate, and $p$ represents the number of glycol urethane units in the polymer.

Polyisocyanates having four or more isocyanate groups give even more complicated polymers, as will be apparent to those skilled in the art.

The isocyanate which can be employed in preparing the telomer urethanes of the invention can be represented by the following general formula:

$$Q—[NCO]_n$$

where Q represents an organic radical, and $n$ represents the number of isocyanate groups, normally from one to about six, and preferably one, two or three.

Q can be any organic radical, such as an aliphatic, alicyclic or heterocyclic group, for instance, alkyl, alkenyl, aryl, alkyl aryl, aralkyl, cycloalkyl, furyl, piperidyl and quinolyl groups. Preferably, in the case of monoisocyanates, Q has from one to about twelve carbon atoms, and in the case of diisocyanates, from two to about twelve carbon atoms.

Representative isocyanates includes butyl isocyanate, dodecyl isocyanate, 2-ethylhexyl isocyanate, phenyl isocyanate, naphthyl isocyanate, tolylene-2,5-diisocyanate, tolylene-2,4-diisocyanate, methylene-di-p-phenyl diisocyanate, hexane-1, 6-diisocyanate, cyclohexylene-1,4-diisocyanate, phenylene-1,4 and phenylene-2,4-diisocyanate, naphthylene-1,5-diisocyanate, propylene-1,2-diisocyanate, butylene-1,2-diisocyanate, dianisidine diisocyanate, 3,3'-dimethyldiphenylmethane-4,4'-diisocyanate, 3,3'-bitolylene-4,4'-diisocyanate, xenylene diisocyanate, diphenylxenylene diisocyanate and triphenylmethane triisocyanate.

The telomeric glycols employed in the reaction with the isocyanates have the formula set forth above, and have a molecular weight between about 118 and about 3000, preferably not above about 1500.

The telomeric urethanes of this invention are formed by heating the telomeric polyolefin glycol with an isocyanate for several hours, at a temperature at which the reaction proceeds, usually about one to three hours, at from about 75° C. to about 110° C. with occasional agitation, and then continuing the reaction for an additional time from four up to about fourteen hours at a higher temperature, usually from about 125° C. to about 175° C. The upper limit of reaction temperature is not critical, and is limited only by the decomposition temperature of the telomer-derived glycol and the isocyanate.

If desired, a urethane catalyst may be used to increase the rate of reaction. Any of the known urethane catalysts can be employed. Such catalysts include the tertiary amines, such as N-methylmorpholine, pyridine, dialkyl aniline, dimethyl ethanolamine, triethylamine, and N,N'-diethyl cyclohexylamine, and metal organic compounds such as the polyvalent metal salts of organic acids, such as the acetyl acetonates such as ferric acetyl acetonate, and cobalt naphthenate, and alkyl tin compounds such as di-nitrityl-tin diacetate, di-n-butyl tin dilaurate, and tin octoate.

Catalytic amounts of these materials are sufficient. The amount depends upon the activity of the catalyst, as those skilled in the art are aware. Generally from about 0.0001 to about 1% catalyst by weight of the isocyanate yields good results. The upper limit is established by the rate of reaction.

The initial product of this reaction will generally be a thermoplastic polyurethane having properties both of urethanes and of telomer-derived polyhydrocarbons.

If a strong, heat-resistant, substantially insoluble material is desired, the polyurethane telomer can be cross-linked. The cross-linking is effected by the methods known to the art for cross-linking polyurethanes. For example, an excess amount of a polyisocyanate can be employed, more polyisocyanate than is theoretically required to react with all of the hydroxyl groups present in the telomeric-derived glycol. Upon heating this material, after formation of the urethane, for several hours, usually from about eight to about twenty hours, in the presence of water, which may be in the form of water added directly to the reaction medium or in the form of atmospheric moisture, a further reaction will take place between the urethane groups and the excess diisocyanate present, converting the urethane groups to allophonate groups, thus producing a cross-linked structure. The additional diisocyanate molecules serve as crosslinks or bridges between polymer chains. The degree of cross-linking may be controlled by the amount of excess diisocyanate employed. A completely cross-linked material requires at least one extra molecule of diisocyanate for every two urethane groups present.

If desired, other types of cross-linking agents may be employed. For example, the aromatic diamines and, in some cases, the aliphatic diamines may also be employed. Representative of this type of curing agent are dichlorobenzidine and p,p'-diaminodiphenylmethane. Additional details of the use of such diamine cross-linking agents may be found in U.S. Patent No. 2,620,516 to Müller.

When diamine curing agents are employed, the amount of polyisocyanate employed should more closely appproximate that which is theoretically required to react with all of the OH groups present in the telomeric glycol. For example, when a diisocyanate is employed, there should not be more than about 100% excess diisocyanate per mole beyond that required to react with all of the OH groups present in the reaction medium. If more isocyanate is present, the reaction between free isocyanate and diamine will often take precedence over the reaction between urethane and diamine, thereby preventing diamine cross-linking. When less isocyanate is employed, there will be incomplete cross-linking, which, for certain uses, may be desirable. The use of less diamine may be desirable, if less cross-linking is desired. The reaction between urethane groups and amine groups gives rise to a substituted urea linkage. Additional reaction may convert the urea linkage to a biuret linkage.

The cross-linked product will vary, depending upon the original molecular weight of the telomeric glycol, from an insoluble wax-like material to an insoluble elastomeric material to a hard, rigid, plastic material. If it is desired to form a thread out of this material, the thermoplastic reaction product of the telomeric glycol with the polyisocyanate may be extruded through a conventional thread extruder and thereafter passed through a hot bath of a curing agent, such as diamine, to yield an infusible, insoluble cross-linked elastomeric thread having excellent physical properties for use in making bathing suits, foundation garments and the like.

Where desired, various fillers may be added to the reaction product of this invention, such as carbon black, silica, colorants and other miscellaneous materials. These fillers may be added in accordance with conventional rubber and plastic technology, as for example, on a two-roll rubber mill or a Banbury mixer.

Although it is known that polyurethanes may be cross-linked by means of ditertiary peroxides, the use of such peroxides for cross-linking may not be desirable in this invention if the basic polyolefin telomer chains are not to be cross-linked, since such peroxides also cross-link polyolefins directly.

The products of this invention may have wide applications in commercial products. Their high melting points and high flow temperatures permit them to be used in coatings and impregnation applications. Viscosities of the products can be varied by controlling the amount of isocyanate used in the reaction, the heating period and the average molecular weight of telomeric derived long chain glycol. Wax paper coatings, for example, frequently require wax of low viscosity, far below the gel point, to control penetration. For this purpose, tailor-made low viscosity urethanes can be prepared and added to wax to produce the desired consistency. Floor polishes, metal coatings and high tensile films require higher viscosity materials. These can also be tailor-made, using higher concentrations if isocyanates or polyisocyanates, higher temperatures, longer reaction times, or telomer-derived glycols of different or varying structure and molecular weight. An increase of up to 50% in tensile strength is exhibited by coatings prepared from urethanes or polyurethanes, as compared to those prepared from unmodified polyethylenes or polyolefin telomers.

The following examples in the opinion of the inventor represent preferred embodiments of polyurethanes of the invention.

EXAMPLE 7

52.0 g. of bis-1,3-butylene glycol diborate (2:2), 2.5 g. of di-tertiary-butyl peroxide and 40.4 g. of benzene were charged to a 250 ml. capacity Magne-Dash autoclave. The contents were flushed and pressure-tested with nitrogen, after which the nitrogen was released. Sufficient gaseous ethylene was then charged into the reactor to produce a pressure of 3480 p.s.i.g. at 134° C. (equivalent to 680 p.s.i.g. at 22° C.). This mixture was heated up to 133 to 163° C., and maintained there for twelve hours, at which point pressure was 90 p.s.i.g. at 161° C. Upon cooling and venting off of the unreacted ethylene, 113 g. of product was obtained. This was fractionated into 19 g. of benzene-insoluble and 40 g. of benzene-soluble acetone-insoluble telomer fractions.

The 40 g. of benzene-soluble telomer fraction was isolated and dissolved in about 200 ml. of toluene, and 10 g. of finely powdered calcium hydroxide and 20 ml. of water were added. The resultant slurry was heated with agitation under a reflux condenser for about thirty minutes. After standing for several minutes, the slurry formed a two-phase mixture, the upper toluene phase and the lower water. The two phases were separated by decantation, and filtered while hot. The toluene phase was heated under vacuum at 100° C. to remove all of the toluene, leaving as the residue the telomeric glycol which was soluble in benzene at room temperature and which had an average molecular weight of about 1000. 16 g. of this telomeric glycol, 5.2 g. of tolylene-2,4-diisocyanate, and 20 ml. of dry pyridine were stirred together and slowly heated to 140° C., and thereafter heated at 145° C. for an additional nine hours. A pinkish clear plastic material was produced, which was molded in a press at about 150° C. to produce a clear flexible film. Further heating of this film at 160–170° C. in the presence of atmospheric moisture for 20 hours produced an infusible, xylene and dimethylformamide-insoluble material.

EXAMPLE 8

The following materials were charged to a 250 ml. capacity Magne-Dash autoclave:

| | Grams |
|---|---|
| 2-methylpentanediol-2,4 glycol borate (1:1) crystals | 46 |
| Di-tert-butyl peroxide | 2.5 |
| Benzene | 40 |

The contents of the autoclave were flushed, and pressure-tested with nitrogen, after which the nitrogen was cautiously released. Sufficient gaseous ethylene was then charged into the autoclave to produce a pressure of 2750 p.s.i.g. at 128° C. (760 p.s.i.g. at 25° C.). The mixture was then heated at 132–154° C. for nine hours (final pressure 210 p.s.i.g. at 146° C.). The mixture was then cooled, and the unreacted ethylene vented off. The benzene-free product weighed 103 g. Extraction with excess benzene produced 39.3 g. of benzene-soluble acetone-insoluble telomer fraction. This material was then dissolved in 400 ml. of benzene, and 25 g. of freshly slaked lime and 12 ml. of water were added. The resultant slurry was refluxed and agitated for thirty minutes. Upon standing for several minutes thereafter, the upper, hot toluene phase was separated from the lower inorganic phase by decantation, and was then filtered. The toluene was removed by vacuum distillation at 100° C., leaving essentially deborated glycol material.

Sixteen grams of the deborated glycol, 5.2 g. of tolylene-2,4-diisocyanate, and 20 ml. of dry pyridine were stirred together and slowly heated to 140° C. and maintained at 140–150° C. for about nine hours. At the end of this time, most of the pyridine had evaporated off, and a pinkish clear plastic melt was produced which was molded in a press above 150° C. to produce clear flexible films of moderate tensile strength. Further heating of this thermoplastic film at 170° C. for eighteen hours in the presence of atmospheric moisture produced a cross-linked product which was essentially insoluble in hot xylene and hot dimethylformamide.

EXAMPLE 9

A 250 ml. capacity autoclave of the Magne-Dash type, provided with means for heating it externally, and cooling it, and a stirrer, was pressure-sealed and evacuated of air. A solution of 45 g. of substantially pure tris(butanediol-1,3) diborate (3:2) and 2.5 g. of di-tert-butyl peroxide dissolved in 40.5 g. of pure benzene was drawn into the evacuated autoclave and the autoclave flushed with nitrogen. USP grade ethylene gas was then passed into the autoclave to produce an equilibrium pressure at 3050 p.s.i.g. at 132° C. The reaction mixture was then heated with agitation at 134 to 142° C. for three hours reaction time.

During the initial phases of the reaction, it was necessary to cool the reaction mixture to maintain control. After 45 minutes the reaction was more than 60% complete. At the conclusion of the reaction time, the pressure was 590 p.s.i.g. at 138° C. The vessel was cooled, the unreacted ethylene vented off, and the benzene solvent distilled off, whereupon 101 g. of a solid material was obtained.

This was thoroughly macerated with benzene at 20° to 30° C. and extracted with excess benzene. 47 g. of a benzene-insoluble telomer remained. This material was a hard wax, having an average molecular weight, determined by the viscosity method, of 1500. From the benzene extract was recovered 29 g. of methanol-insoluble benzene-soluble telomer having a cryoscopic average molecular weight of 1400.

The telomer was refluxed with a 10% sodium hydroxide solution for 1 hour. The glycol resulting therefrom was a solid, which was broken up and washed thoroughly with saturated sodium chloride soultion to remove the alkali, and then dried. 16 g. of this glycol (molecular weight 1400) was reacted with 5.2 g. of toluene-2-4-diisocyanate in 20 cc. of dry pyridine, together with stirring, while the temperature was slowly raised to 100° C., and then heated at 140 to 150° C. for an additional nine hours. A pinkish clear plastic melt was produced which was packed into a mold, and the mold was then heated at 160 to 170° C. for 16 hours. The final product was an insoluble thermoset resin that was insoluble in boiling xylene and dimethylformamide.

This application is a continuation in part of co-pending application Serial No. 116,697, filed June 13, 1961, which in turn was a continuation in part of application Serial No. 821,111, filed June 18, 1959, and now abandoned.

I claim:

1. A process for producing olefin telomer glycols which comprises telomerizing an alpha olefin taxogen having from about two to about twelve carbon atoms in the molecule with an alkylene glycol borate having from about three to thirty carbon atoms in the colecule in the presence of a free radical initiator capable of initiating the telomerization at a temperature at which an evolution of free radicals from the initiator is obtained, and then deborating the resulting boron-containing olefin telomer to produce the corresponding glycol.

2. A process in accordance with claim 1 in which the temperature is within the range from 40 to 200° C.

3. A process in accordance with claim 1 in which the alpha olefin is ethylene.

4. A process in accordance with claim 1 in which the alpha olefin is a mixture of ethylene and a second alpha olefin, the ethylene being present in a major proportion.

5. A process in accordance with claim 1 in which the free radical initiator is a dialkyl peroxide.

6. A process in accordance with claim 1 in which the telogen is an alpha-alkylene glycol borate.

7. A process in accordance with claim 1 in which the telogen is a beta-alkylene glycol borate.

8. A process in accordance with claim 1 in which the deboration is carried out using an aqueous alkaline solution.

9. A process in accordance with claim 8 in which the deboration is carried out using an aqueous alkaline alcoholic solution.

10. A process in accordance with claim 8 in which the alkali is sodium hydroxide.

11. A process in accordance with claim 8 in which the alkali is calcium hydroxide.

12. A process in accordance with claim 1 in which the deboration is carried out using an organic solvent comprising an inorganic base.

13. A process for producing olefin telomer glycols from alkylene glycols which comprises forming an alkylene glycol borate from the alkylene glycol, telomerizing an alpha olefin taxogen having from about two to about twelve carbon atoms in the molecule with an alkylene glycol borate having from about three to about thirty carbon atoms in the molecule in the presence of a free radical initiator capable of initiating the telomerization at a temperature at which an evolution of free radicals from the initiator is obtained, and then deborating the resulting boron-containing olefin telomer to produce the corresponding glycol.

References Cited in the file of this patent

UNITED STATES PATENTS

| | | |
|---|---|---|
| 2,396,261 | Harmon | Mar. 12, 1946 |
| 2,402,137 | Hanford | June 18, 1946 |
| 2,866,774 | Price | Dec. 30, 1958 |
| 2,929,800 | Hill | Mar. 22, 1960 |

UNITED STATES PATENT OFFICE
CERTIFICATE OF CORRECTION

Patent No. 3,141,047                 July 14, 1964

Donald D. Emrick

It is hereby certified that error appears in the above numbered patent requiring correction and that the said Letters Patent should read as corrected below.

Column 3, lines 10 to 17, the right-hand portion of the formula should appear as shown below instead of as in the patent:

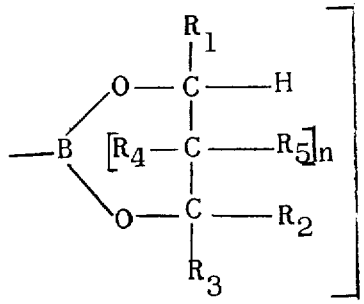

formula I (3), the left-hand portion of the formula should appear as shown below instead of as in the patent:

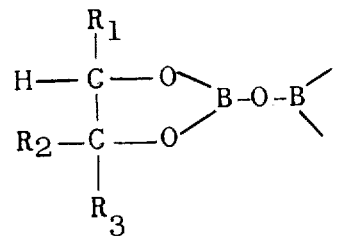

formula I (4), the right-hand portion of the formula should appear as shown below instead of as in the patent:

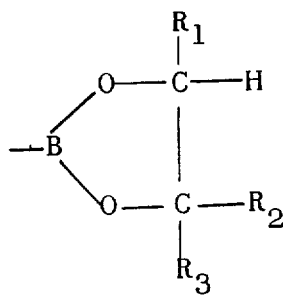

same column 3, formula II (1), the formula should appear as 3,141,047 shown below instead of as in the patent:

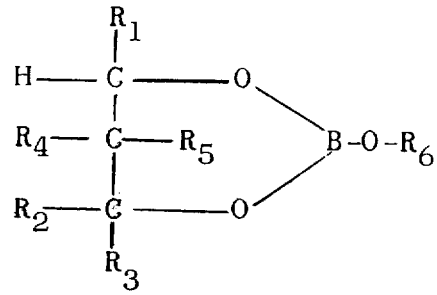

column 4, lines 18 to 25, for that portion of the formula reading

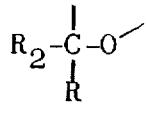   read   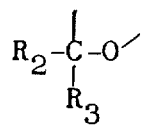

column 10, line 26, for "3" read -- 30 --; column 17, line 16, for "colecule" read -- molecule --.

Signed and sealed this 24th day of November 1964.

(SEAL)
Attest:

ERNEST W. SWIDER
Attesting Officer

EDWARD J. BRENNER
Commissioner of Patents